US007730392B2

(12) United States Patent
Boyles et al.

(10) Patent No.: US 7,730,392 B2
(45) Date of Patent: *Jun. 1, 2010

(54) ELECTRONIC WEB STICKY

(75) Inventors: Ryan A. Boyles, Wake Forest, NC (US);
Kimberly D. Kenna, Cary, NC (US);
Robert Leah, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/477,385

(22) Filed: Jun. 3, 2009

(65) Prior Publication Data

US 2009/0249233 A1    Oct. 1, 2009

Related U.S. Application Data

(63) Continuation of application No. 11/163,141, filed on Oct. 6, 2005, now Pat. No. 7,565,617.

(51) Int. Cl.
*G06F 3/048* (2006.01)
(52) U.S. Cl. ........................ 715/233; 715/715; 715/808; 715/809
(58) Field of Classification Search .................. 715/764, 715/233, 715, 808, 809; 345/619
See application file for complete search history.

(56) References Cited

U.S. PATENT DOCUMENTS 5,239,466 A    8/1993    Morgan et al.

| 6,313,855 | B1 | 11/2001 | Shuping et al. |
| 6,567,918 | B1 | 5/2003 | Flynn et al. |
| 6,697,838 | B1 | 2/2004 | Jakobson |
| 6,771,291 | B1 | 8/2004 | DiStefano, III |
| 7,472,341 | B2 | 12/2008 | Albornoz et al. |
| 2002/0054114 | A1 | 5/2002 | Shuping et al. |
| 2002/0178225 | A1 | 11/2002 | Madenberg et al. |
| 2003/0090510 | A1 | 5/2003 | Shuping et al. |

(Continued)

FOREIGN PATENT DOCUMENTS

JP    2004287559    10/2004

OTHER PUBLICATIONS

Karger et al. "Sticky Notes for the Semantic Web" IUI '03, Jan. 12-15, 2003, Miami, Florida.

(Continued)

*Primary Examiner*—William L Bashore
*Assistant Examiner*—Daeho D Song
(74) *Attorney, Agent, or Firm*—R. Brian Drozd; Charles L. Moore; Moore & Van Allen, PLLC

(57) ABSTRACT

A method to provide an electronic web sticky may include placing a web sticky icon proximate to a selected feature on a web page to which the web sticky may be associated. The method may also include providing a plurality of options for selecting a web sticky type.

16 Claims, 8 Drawing Sheets

U.S. PATENT DOCUMENTS

2003/0187878 A1 10/2003 Sandifer
2004/0088422 A1 5/2004 Flynn et al.
2004/0148340 A1 7/2004 Cotte
2004/0167813 A1 8/2004 Robertson et al.
2004/0225716 A1 11/2004 Shamir et al.
2005/0091578 A1 4/2005 Madan et al.
2005/0223315 A1 10/2005 Shimizu et al.

OTHER PUBLICATIONS

Minnick, Chris. "Visualizing Sticky Web Pages" Software Development Magazine On-Line, Mar. 16, 2005, pp. 1-7.
Noone, Paul. "winTack" Aug. 1, 2001, ABIX/LexizNexis Australia, p. 82, abstract.
"Zezame 2.0 launched: New Product enables 'sticky note' collaboration for web pages" Jun. 2, 2003, M2, Presswire, M2 Communications, Ltd.

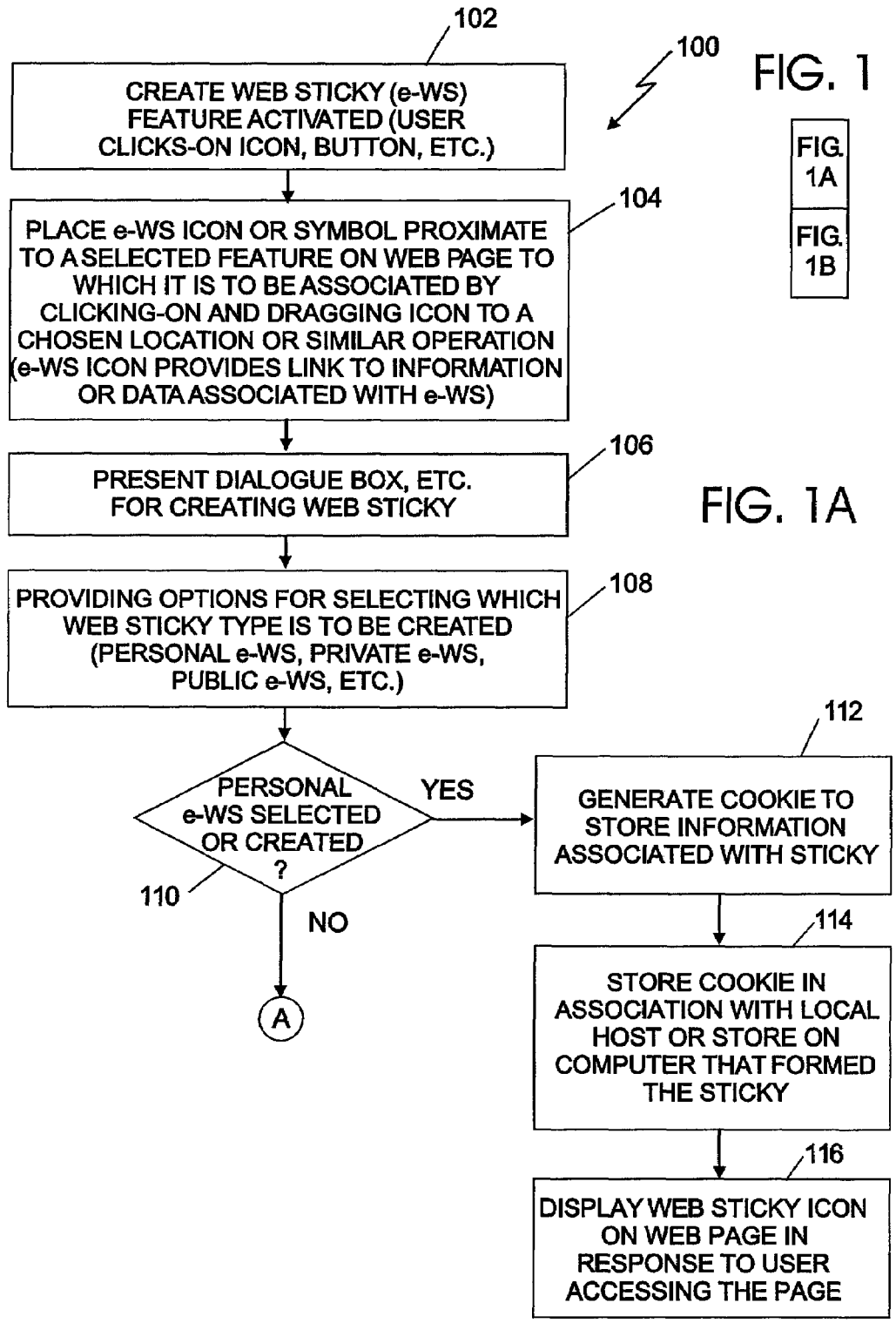

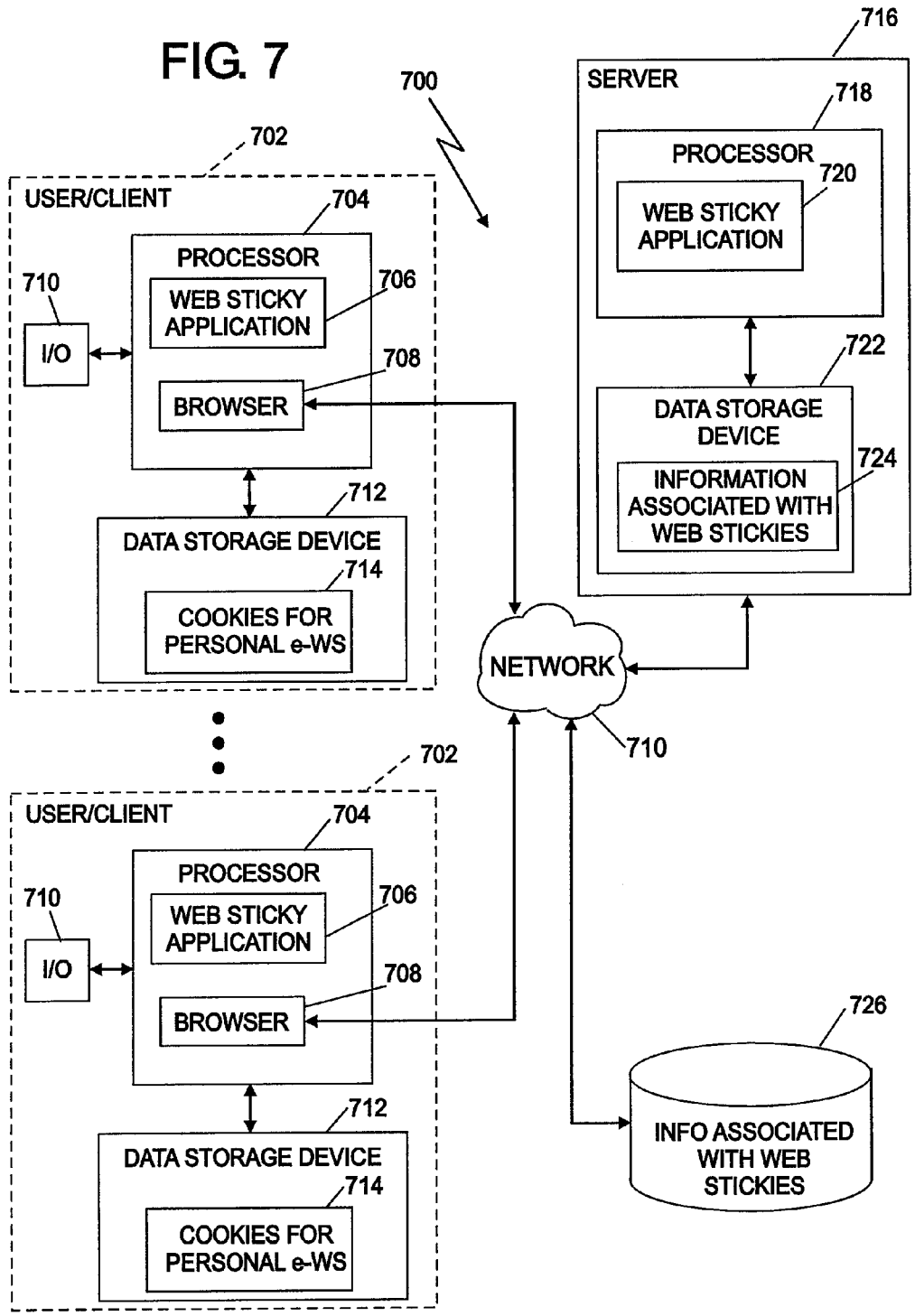

ELECTRONIC WEB STICKY

CROSS-REFERENCE TO RELATED APPLICATION

This application is a continuation application of U.S. patent application Ser. No. 11/163,141, filed Oct. 6, 2005, the contents of which are incorporated herein by reference.

BACKGROUND OF THE INVENTION

The present invention relates to the Internet, private networks or the like, and more particularly to a method and system for providing an electronic web sticky in association with a selected item on a web page, a selected portion of a web page or the like.

There are often times when a user of the Internet, private network or the like may take a special interest in a specific feature on a web page, such as an item on the web page or portion of a web page, a specific image, section of text, a link that contains data or the like, that the user may want to be drawn to on return trips to the web page. Alternatively, the user may note a problem with a web page, such as misinformation, a dead link or the like. Currently, a user may bookmark an entire page and use some other medium external to the actual web page, such as a physical sticky note, Personal Data Assistance (PDA), text file or similar means, to remind themselves what anchor or actual feature on the web page was of interest to them and, also possibly, the reason why the feature interested them. Use of these different media to document points or features of interest within a web page can be cumbersome and difficult to organize. Such means are not readily or automatically moveable with the user from one system to another and are not capable of being easily shared with others, such as the owner or provider of the web site. Web site owners may provide means for users to share feedback, such as discussion forums, blogs or the like. However, such forums do not provide a means to tie the feedback to a specific anchor or feature on the web page.

BRIEF SUMMARY OF THE INVENTION

In accordance with an embodiment of the present invention, a method to provide an electronic web sticky may include placing a web sticky icon proximate to one of a selected feature on a web page to which the web sticky is to be associated. The method may also include providing a plurality of options for selecting a web sticky type.

In accordance with another embodiment of the present invention, a system to provide an electronic web sticky may include a web sticky application operable on a processor for a user to place a web sticky icon proximate to a selected feature on a web page to which the web sticky may be associated. The system may also include a plurality of options presentable to a user by the web sticky application for selecting a web sticky type.

In accordance with another embodiment of the present invention, a computer program product to provide an electronic web sticky may include a computer usable medium having computer usable program code embodied therein. The computer usable medium may include computer usable program code configured to facilitate placing a web sticky icon proximate to a selected feature on a web page to which the web sticky is to be associated. The computer usable medium may also include computer usable program code configured to provide a plurality of options for selecting a web sticky type.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

FIGS. 1A and 1B (collectively FIG. 1) are a flow chart of an example of a method to provide an electronic web sticky in accordance with an embodiment of the present invention.

FIG. 7 is a block diagram of an example of a system to provide an electronic web sticky in accordance with an embodiment of the present invention.

DETAILED DESCRIPTION OF THE INVENTION

Figure 1B:
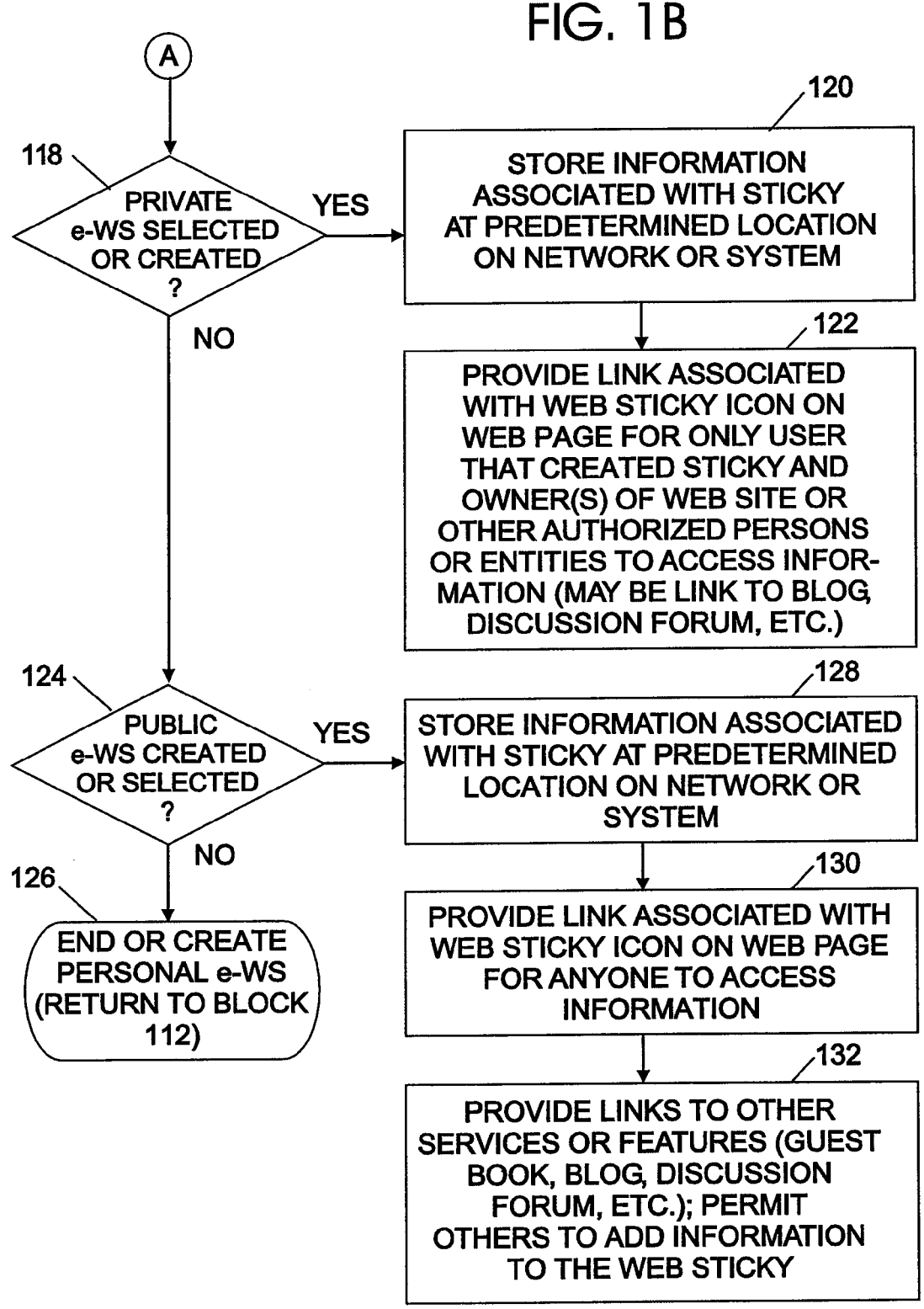

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIGS. 1A and 1B (collectively FIG. 1) are a flow chart of an example of a method 100 to provide an electronic web sticky in accordance with an embodiment of the present invention. In block 102, a create web sticky (e-WS) feature, application or program may be activated or accessed. The web-stick feature may be activated or accessed by clicking-on or otherwise activating an icon, button or the like on a web page.

Figure 2:
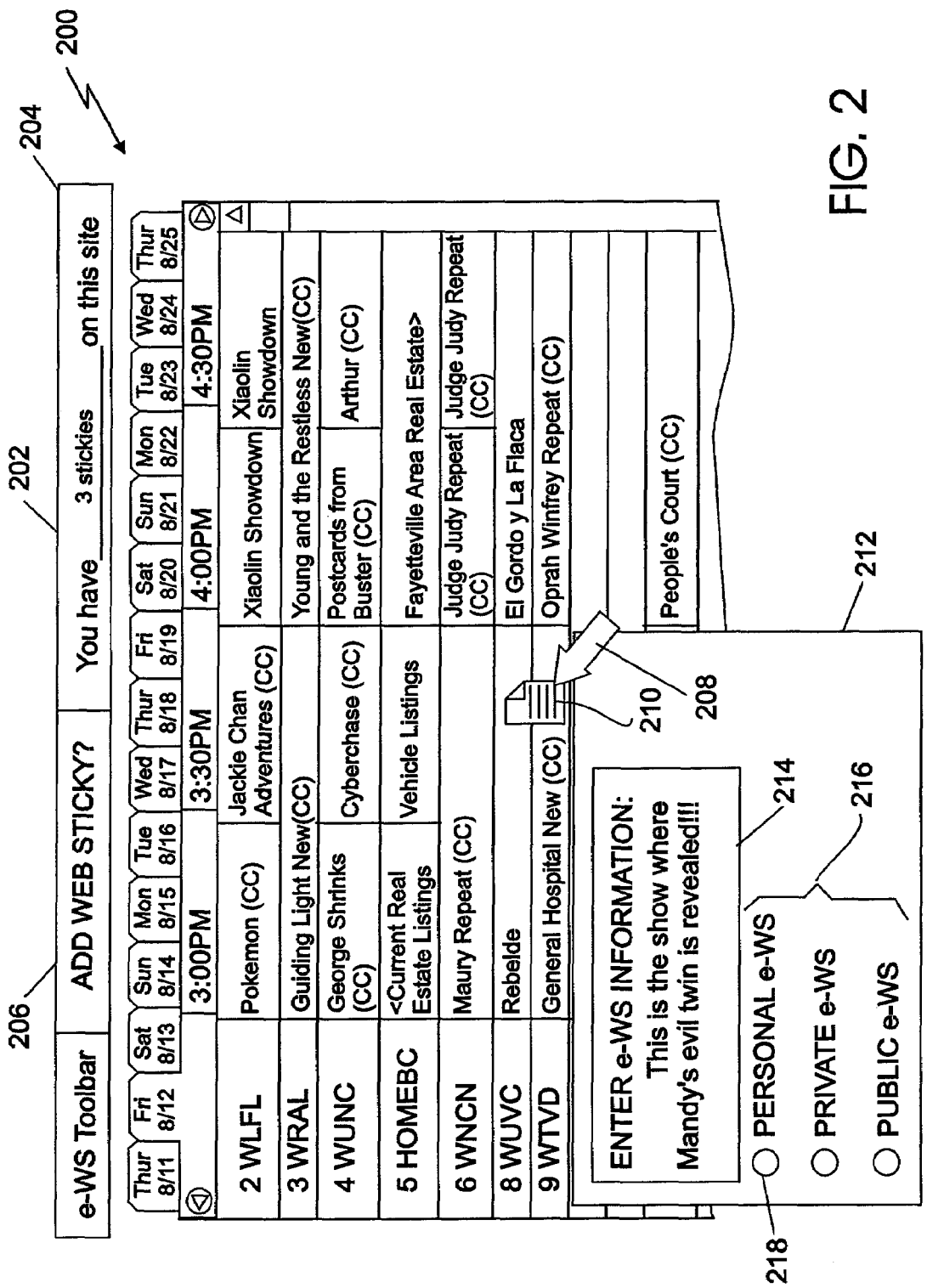
FIG. 2 is an exemplary web page illustrating an example an electronic web sticky feature in accordance with an embodiment of the present invention.

Referring also to FIG. 2, FIG. 2 is an exemplary web page 200 illustrating an example an electronic web sticky feature 202 in accordance with an embodiment of the present invention. The electronic web sticky feature 202 on a web page may be embodied in an electronic web sticky or e-WS tool bar similar to an e-WS tool bar 204 in FIG. 2. The e-WS tool bar 204 may include an icon or button 206 that may be labeled "Add Web Sticky?" or other descriptive label of the function of the icon or button 206. The button 206 may be clicked-on or otherwise activated to create a web sticky using a computer pointing device or mouse that may be represented or rendered on a computer monitor or display by an arrow 208 as shown in FIG. 2.

Referring back to FIG. 1, in block 104, an e-WS icon or symbol may be placed proximate to a selected feature on a web page to which the web sticky is to be associated. The selected feature may be a specific image, text, a particular portion of the web page, a link that contains information, or another item that may appear on the web page and be of interest to a user creating the web sticky. As illustrated in FIG. 2, in one embodiment of the present invention, an e-WS icon 210 may be created in response to clicking-on the "Add Web Sticky?" icon 206 with the computer pointing device 208. The e-WS icon 210 may then be dragged to a selected feature or location on the web page 200 to which the web sticky is to be associated. As described in more detail below, the e-WS icon 210 may provide a link for some types of web stickies to information or data associated with the web sticky that may be remotely stored on a system or network, such as the Internet or private network.

In block 106, a dialogue box may be presented to a user for creating the web sticky. In block 108, options for selecting which type of web sticky is to be created may be provided. Examples of the different types of web stickies may include a personal web sticky, a private web sticky, a public web sticky or the like. As described in more detail herein, a personal web sticky may include information that is available only for the user who created the web sticky and may not be shared with a provider of the web site or anyone else. A private web sticky may include information that may be shared with an owner or provider of the web page or site and may possibly be shared with other users or entities that may be defined or authorized by the user that creates the web sticky. A public web sticky may include information that may be shared with or made available to anyone that accesses the web page.

The web sticky feature 202 of FIG. 2 illustrates a dialogue box 212 that includes a field 214 for entering the e-WS information to be associated with the web sticky 210. The dialogue box may also include a plurality of options 216 for selecting a type of web sticky that is to be created. A web sticky type option 216 may be selected by clicking on a radio button 218 or the like associated with a particular option.

Figure 3:
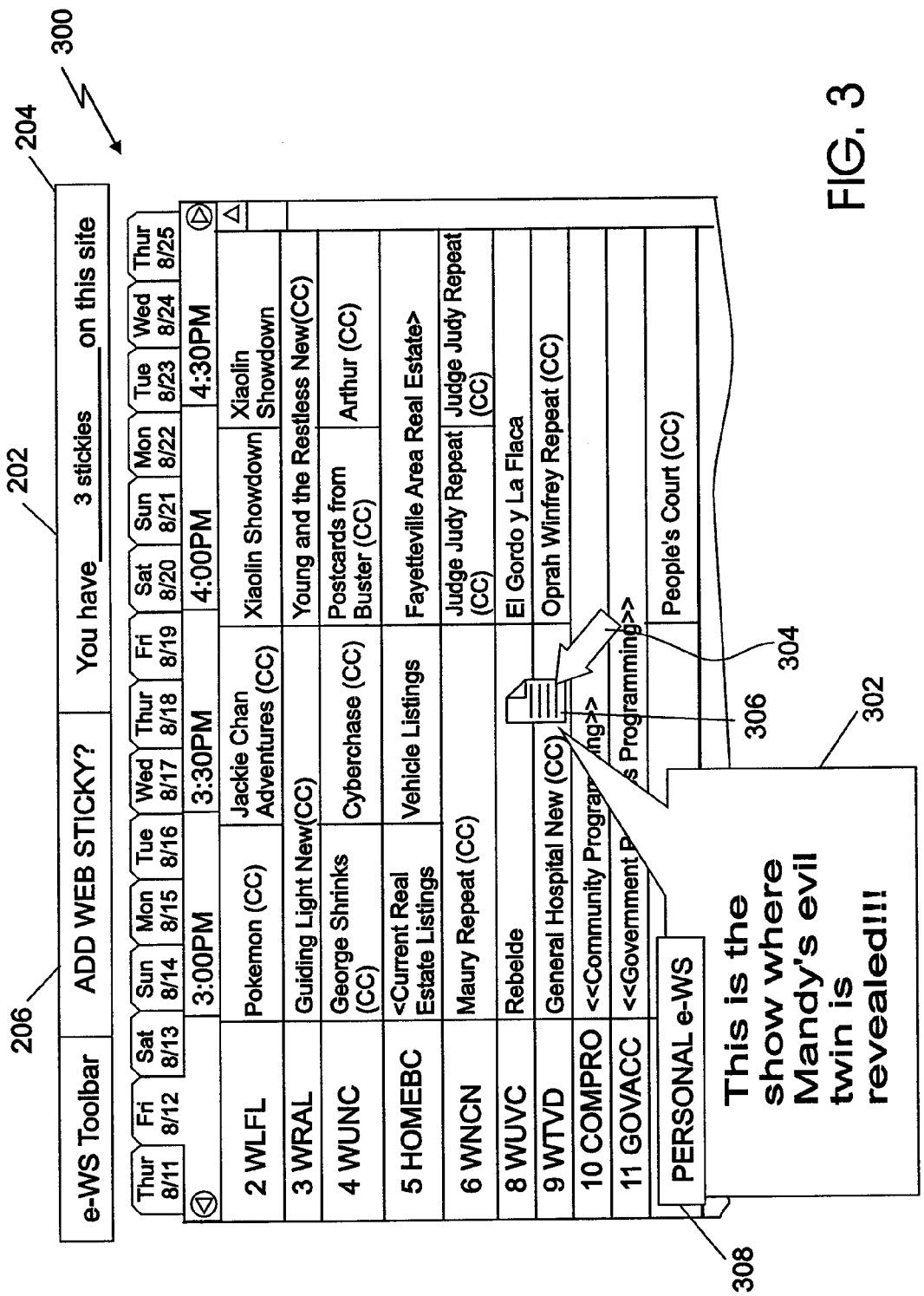
FIG. 3 is an exemplary web page illustrating an example of a personal electronic web sticky in accordance with an embodiment of the present invention.

In block 110 (FIG. 1A) a determination may be made if a personal e-WS option was selected in block 108. If a personal web sticky is to be created, the method 100 may advance to block 112. In block 112, a cookie may be generated or formed to store information associated with the web sticky. In block 114, the cookie may be stored in association with a local host or computer that formed or created the web sticky. In block 116, a web sticky icon may be generated and displayed in response to the user accessing the web page to which the web sticky is associated. Referring also to FIG. 3, FIG. 3 is an exemplary web page 300 illustrating an example of a personal electronic web sticky 302 in accordance with an embodiment of the present invention. The web sticky 302 may be displayed in response to a computer pointing device arrow 304 being positioned in contact with the web sticky icon 306. The web sticky 302 may include an indicator 308 or label that the web sticky 303 is a personal web sticky. The user may perform a "right-click" operation or similar operation to edit or delete the web sticky 302. The user may also be presented the web sticky options similar to that shown in FIG. 2 to select a different web sticky type.

Returning to FIG. 1, if a determination is made in block 110 that a personal web sticky was not selected in block 108 or is not being created, the method 100 may advance to block 118. In block 118, a determination may be made if a private web sticky option was selected in block 108 and is to be created. If the determination is that a private electronic web sticky is to be created in block 118, the method 100 may advance to block 120. In block 120, information associated with the private web sticky may be stored at a predetermined location on the network or system. In block 122, a link associated with the private web sticky may be provided on the web page so that the information is only accessible or available to the user that created the web sticky, a provider or owner or owners of the web page or site and other persons or entities that may have been authorized to access the information. In one embodiment of the present invention, the link may be to a blog, discussion forum or the like.

Figure 4:
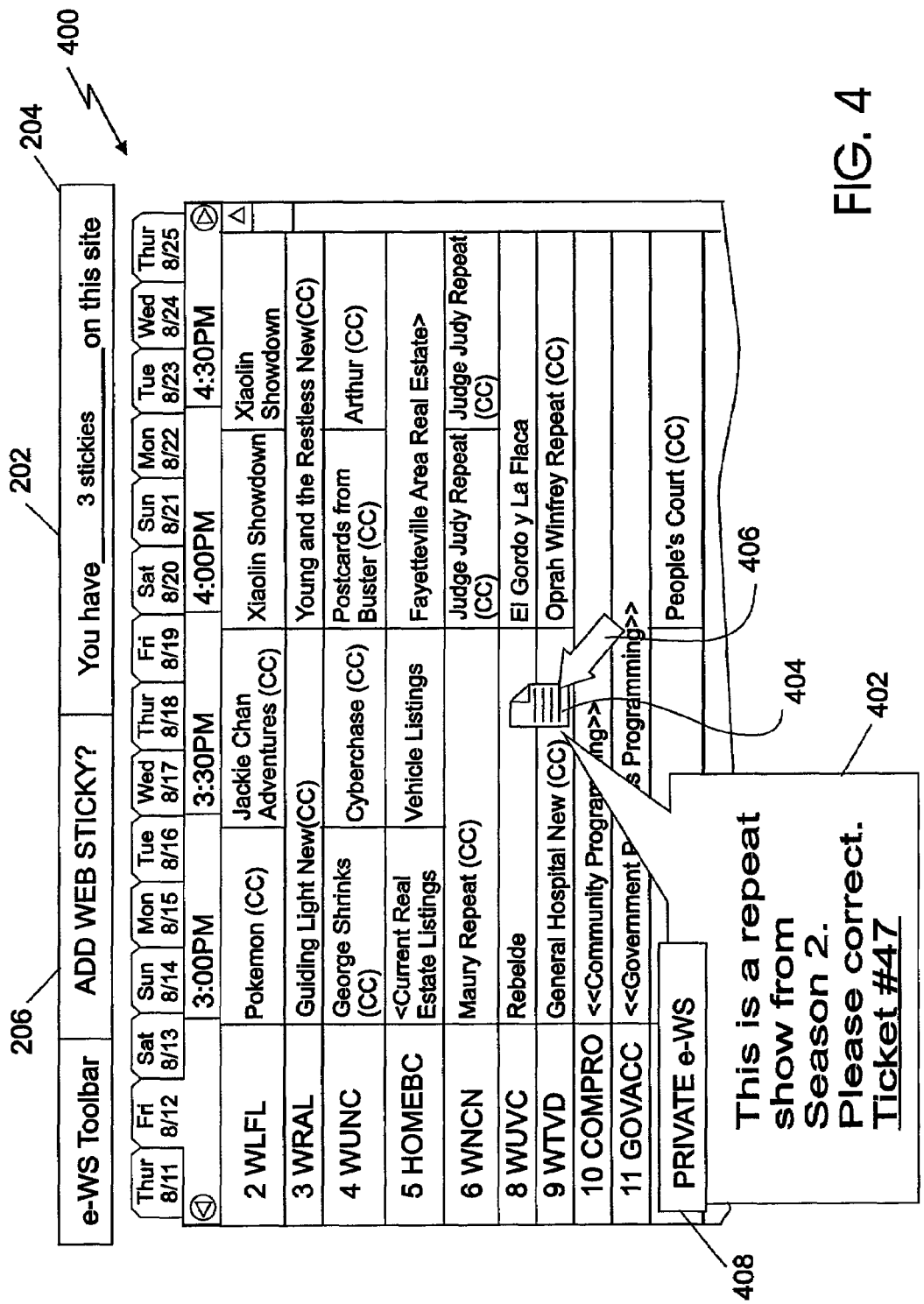
FIG. 4 is an exemplary web page illustrating an example of a private electronic web sticky in accordance with an embodiment of the present invention.

Referring also to FIG. 4, FIG. 4 is an exemplary web page 400 illustrating an example of a private electronic web sticky 402 in accordance with an embodiment of the present invention. The private electronic web sticky 402 may be presented or made available to an authorized user in response to a computer pointing device illustrated by arrow 406 contacting the web sticky icon 404. As discussed above an authorized user may be the user that created the private web sticky, an owner or provider of the web page or site, or other persons or entities authorized access to the information associated with the web sticky 402. In one embodiment of the present invention, the web sticky icon 404 may only be presented when an authorized user accesses the web page 400. In another embodiment of the invention, the private web sticky icon 404 may be presented to everyone that accesses the web page 400 but the web sticky 402 will only pop-up in response to a pointing device 406 of an authorized user contacting the icon 404.

The private web sticky 402 may include an indicator 408 or other means to identify the web sticky 402 as a private web sticky. The user may also edit or change the web sticky type by a right clicking operation or other operation. A dialogue box similar to dialogue box 212 (FIG. 2) may be presented in response to the right click or other editing action for the user to edit the private web sticky 402.

Returning to FIG. 1, if a determination is made in block 118 that a private web sticky option was not selected in block 108, the method 100 may advance to block 124. In block 124, a determination may be made whether a public web sticky option was selected in block 108 or a public web sticky is to be created. If a public web sticky option was not selected, the method 100 may end at termination 126 or by default a personal web sticky may be created and the method 100 may return to block 112.

If a determination is made in block 124 that a public web sticky was selected in block 108, the method 100 may advance to block 128. In block 128, information associated with the public web sticky may be stored at a predetermined location on the network or system. In block 130, a link may be provided in association with the web sticky icon on the web page for anyone accessing the web page to access the information associated with the web sticky. In block 132, links to other services or features may be provided. Examples of other services or features may include a guest book, a blog, a discussion forum or the like. Other users may also be permitted to add information or respond to information on the public web sticky in block 132.

Figure 5:
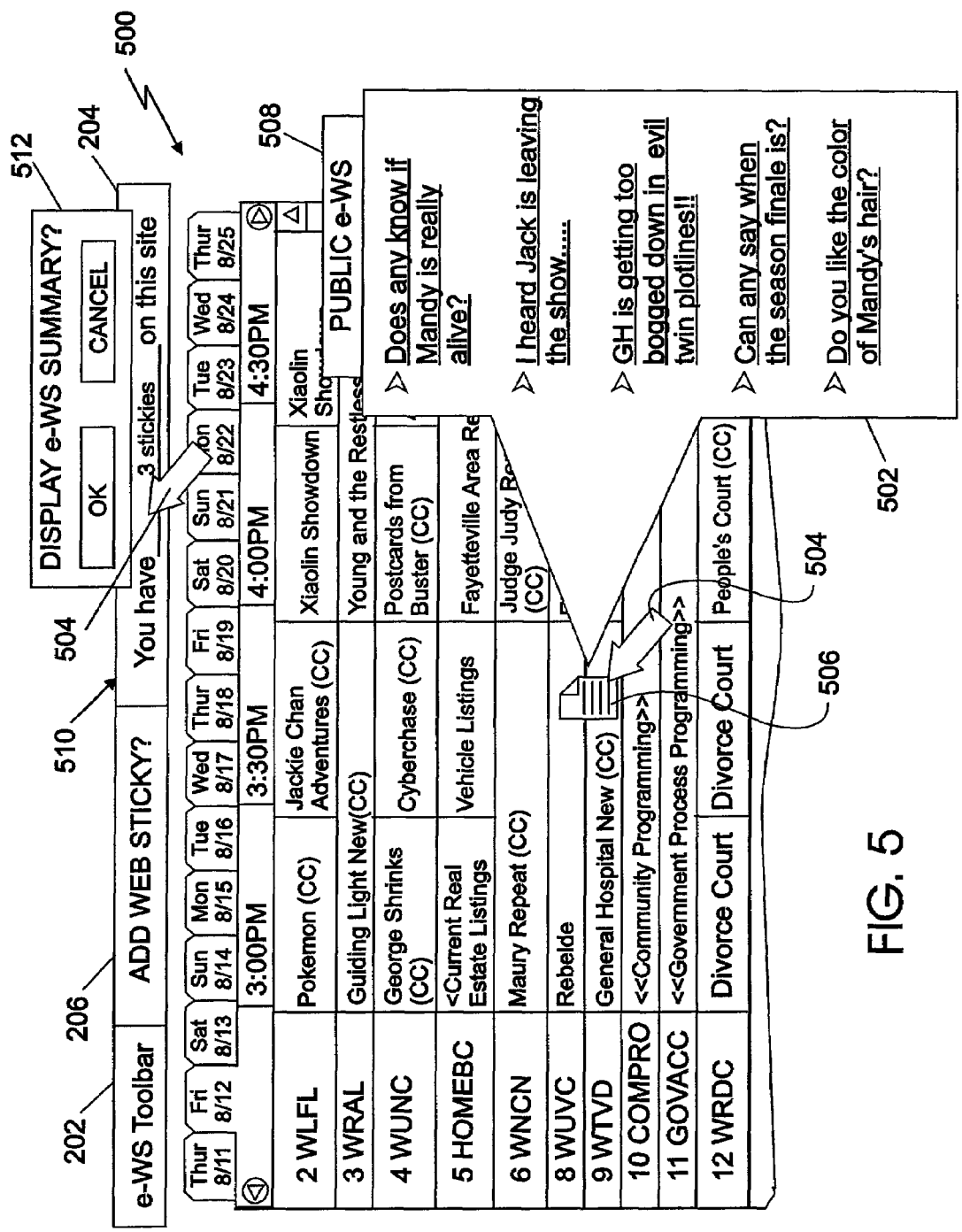
FIG. 5 is an exemplary web page illustrating an example of a public electronic web sticky in accordance with an embodiment of the present invention.

Referring also to FIG. 5, FIG. 5 is an exemplary web page 500 illustrating an example of a public electronic web sticky 502 in accordance with an embodiment of the present invention. The public electronic web sticky 502 may be presented or displayed in response to a computer pointing device embodied by arrow 504 in FIG. 5 contacting a web sticky icon 506 in web page 500. The public web sticky 502 may include an indicator 508 or other label to identify the sticky 502 as a public sticky. As illustrated in FIG. 5, different users may enter additional information in the public web sticky 502 or respond to questions posed in the web sticky.

In another embodiment of the present invention, the different types of web stickies, i.e., personal e-WS, private e-WS, public e-WS or the like may each be distinguished from one another by a different colored background 509 or different colored font or style of font, or by any other scheme that may be selected by the user to distinguish the different types of web stickies.

Figure 6:
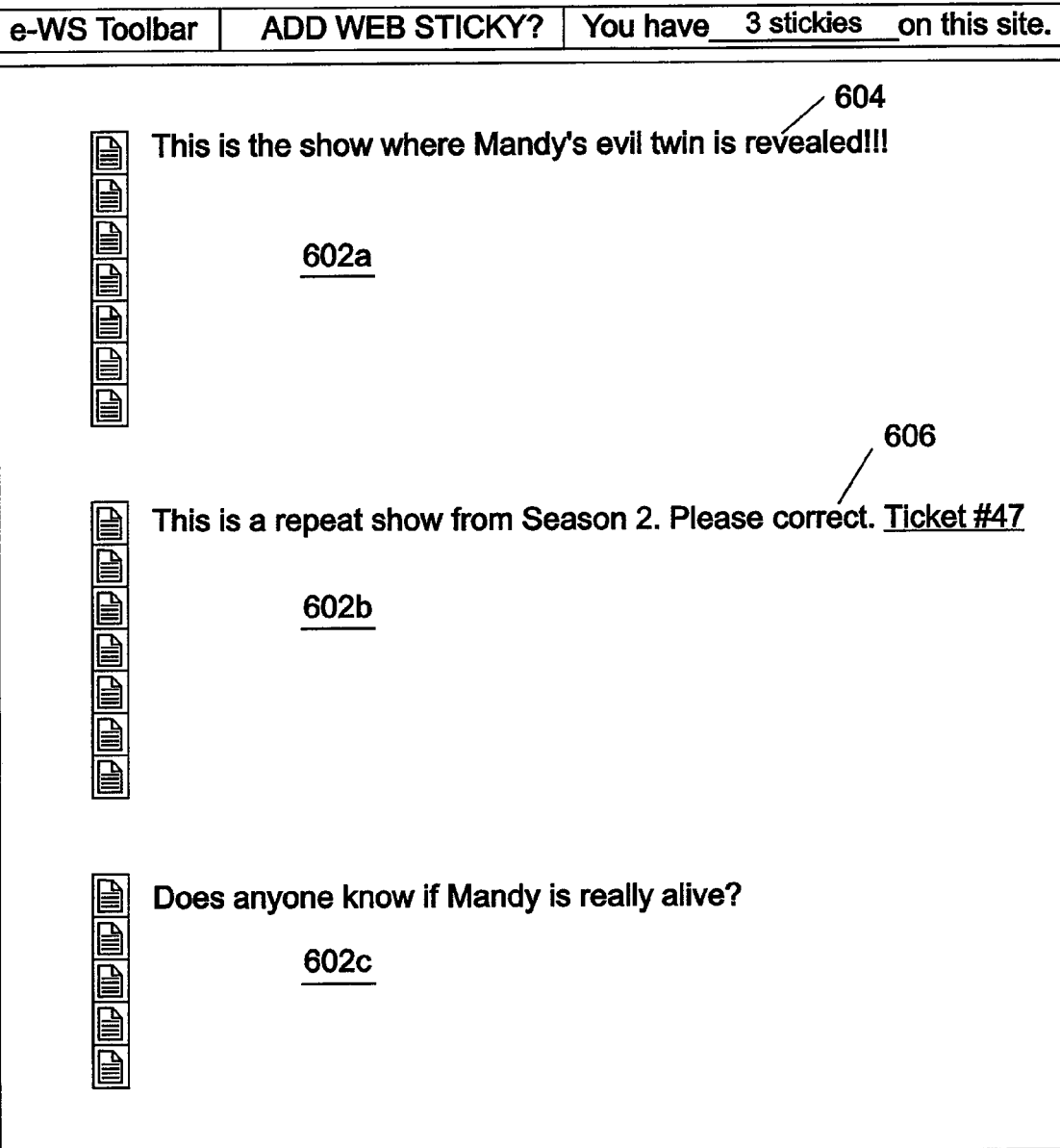
FIG. 6 is an example of a web sticky summary page for a web site in accordance with an embodiment of the present invention.

The e-WS toolbar 204 in each of FIGS. 2-5 may illustrate an indication 510 (FIG. 5) of the number of web stickies associated with the web site or page being viewed. A box 512 asking if a user wants to display an e-WS summary may be presented in response to a user contacting the indicator 510 with the computer pointing device 504. FIG. 6 is an example of a web sticky summary page 600 for a web site in accordance with an embodiment of the present invention. The summary page 600 may include sections 602a-602c for each of the different types of web stickies. The web stickies for each type may be displayed only to users authorized access to the respective stickies otherwise only an indication of the existence of a web sticky of that type may be presented. Accordingly, only the user who created a personal web sticky would be able to view the personal web sticky 604 in the personal web sticky or personal notes section 602a. Similarly, only authorized users would be able to view the private web sticky 606 in the private web sticky or private notes section 602b. However, every user may be able to view the public web sticky 608 in the public web sticky or public notes section 602c.

FIG. 7 is a block diagram of an example of a system 700 to provide an electronic web sticky in accordance with an embodiment of the present invention. The system 700 may include one or more user computer systems or clients 702 that may each be a personal computer (PC), computer workstation, portable computer device, such as a personal data assistant (PDA) or the like, or other computing device capable of accessing a network. The user computer system or client 702 may include a processor 704. A web sticky application 706 may be operable on the processor 704. The method 100 as described with respect to FIG. 1 or some features of the method 100 may be embodied in the web sticky application 706. A browser 708 or web browser, such as Netscape, Microsoft's Internet Explorer, Mozilla or the like, may also be operable on the processor 704 to access a network 710. Netscape is a trademark of Netscape Communications Corporation in the United States, other countries or both. Internet Explorer is a trademark of the Microsoft Corporation in the United States, other countries or both and Mozilla is a trademark of the Mozilla Foundation in the United States, other countries or both. The network 710 may be the Internet, private network, such as an intranet or extranet, or other type network.

Each user computer system 702 may also include input/output (I/O) devices 710. The I/O devices 710 may include input devices, output devices or combination input/output devices. The I/O devices 710 may include a monitor, a keyboard, mouse or pointing device, drives, such as mechanical, magnetic or optical disk drives or the like, or other devices that may facilitate an end user operating and controlling the user computer system 702 and the web sticky application 706.

The user computer system 702 may further include a data storage device 712. The data storage device 712 may store other applications operable on the processor 704 and other data or information that may be used for operation of the user computer system 702. The data storage device 712 may also store cookies 714 for use with personal electronic web stickies as described with respect to the method 100 of FIG. 1.

The system 700 may also include a server 716. The server 716 may be accessed by the user computer systems 702 via their respective browsers 708 and the network 710. Each server 716 may include a processor 718 and a web sticky application 720 operable on the processor 718. The web sticky application may embody the method 100 of FIG. 1 or some elements of the method 100 in coordination with the web sticky application 706 operable on the processor 704 of the user computer system 702. The server 716 may also include a data storage device 722. The data storage device 722 may store information 724 associated with the web stickies, such as information associated with private or public web stickies as described with respect to method 100.

Information associated with the web stickies may also be stored on the network or system 700 at other predetermined locations as illustrated by database 726.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system to provide an electronic web sticky, comprising:
   a processor:
   a web sticky application operable on the processor for a user to place only a web sticky icon proximate to a selected feature on a web page to which the web sticky is to be associated, wherein content of the electronic web sticky is only displayed in response to a predetermined action by the user, the content of the electronic web sticky being displayed using a balloon that identifies which electronic web sticky icon is associated with the displayed content, and the web sticky icon being displayed outside of the balloon;
   presenting a web sticky tool bar, wherein the web sticky tool bar is separate from the web sticky; and
   a plurality of options presentable to a user by the web sticky application for selecting a web sticky type; wherein the plurality of options for selecting a web sticky type comprises providing options for selecting one of a personal web sticky, a private web sticky, and a public web sticky.

2. The system of claim 1, further comprising a data structure to generate a cookie to store information associated with the web sticky in response to a private web sticky type being created on the web page.

3. The system of claim 1, further comprising a link being provided in association with the web sticky icon for only a user that created the web sticky, an owner of the web page and any other authorized persons to access information associated with the web sticky in response to a private web sticky being created on the web page.

4. The system of claim 1, further comprising a link being provided in association with the web sticky icon for anyone to access information associated with the web sticky in response to a public web sticky being created on the web page.

5. A computer program readable storage medium to provide an electronic web sticky, the computer readable storage medium comprising:
   computer usable program code configured to facilitate placing only a web sticky icon proximate to a selected feature on a web page to which the web sticky is to be associated;
   computer usable program code configured to only display content of the electronic web sticky in response to a predetermined action by the user, the content of the electronic web sticky being displayed using a balloon that identifies which electronic web sticky icon is associated with the displayed content, and the web sticky icon being displayed outside of the balloon;
   computer usable program code configured to present a web sticky tool bar, wherein the web sticky tool bar is separate from the web sticky; and
   computer usable program code configured to provide a plurality of options for selecting a web sticky type; wherein the plurality of options for selecting a web sticky type comprises providing options for selecting one of a personal web sticky, a private web sticky, and a public web sticky.

6. The computer readable storage medium of claim 5, further comprising computer usable program code configured to generate a cookie to store information associated with the web sticky in response to a personal web sticky type being created on the web page.

7. The computer readable storage medium of claim 5, further comprising:

computer usable program code configured to store information associated with the web sticky on a network in response to a private web sticky type being created on the web page; and computer usable program code configured to provide a link associated with the web sticky icon on the web page for only a user that created the private web sticky, an owner of the web page and any other authorized persons to access the information.

8. The computer readable storage medium of claim 5, further comprising:

computer usable program code configured to store information associated with the web sticky on a network in response to a public web sticky type being created on the web page; and computer usable program code configured to provide a link associated with the web sticky icon on the web page for anyone to access the information.

9. The computer readable storage medium of claim 5, further comprising:

computer usable program code configured to make a personal web sticky accessible to only a user that created the personal web sticky in response to a personal web sticky option being selected;

computer usable program code configured to make a private web sticky accessible to only the user that created the private web sticky, an owner of the web page and any other authorized users in response to a private web sticky option being selected; and computer usable program code configured to make a public web sticky accessible to anyone that accesses the web page in response to a public web sticky option being selected.

10. A system to provide an electronic web sticky, comprising:

a processor;

presenting a web sticky tool bar, wherein the web sticky tool bar is separate from the web sticky;

a web sticky application operable on the processor for a user to place only a web sticky icon proximate to a selected feature on a web page to which the web sticky is to be associated by allowing the user to click on the web sticky tool bar using a computer pointing device and to drag the web sticky icon from the web sticky tool bar and to drop the web sticky icon proximate to the selected feature, wherein the web sticky application is adapted to only display content of the electronic web sticky in response to a predetermined action by the user, the content of the electronic web sticky being displayed using a balloon that identifies which electronic web sticky icon is associated with the displayed content, and the web sticky icon being displayed outside of the balloon;

a dialogue box presentable to the user by the web sticky application to create the web sticky to be associated with the web sticky icon; and presenting to the user accessing the web page a personal web sticky label that labels the web sticky as a personal web sticky in response to the web sticky being accessible by only a creator of the web sticky;

presenting to the user accessing the web page a private web sticky label that labels the web sticky as a private web sticky in response to the web sticky being accessible by only select users authorized by the creator of the web sticky; and presenting to the user accessing the web page a public web sticky label that labels the web sticky as a public web sticky in response to the web sticky being accessible by any user accessing the web page.

11. The system of claim 10, further comprising a plurality of options presentable to the user by the web sticky application for creating the web sticky.

12. The system of claim 10, wherein the dialogue box comprises a field to permit information to be entered by the user to be associated with the web sticky icon.

13. The system of claim 10, wherein the dialogue box comprises means for selecting a type of web sticky from a plurality of types of web stickies.

14. The system of claim 13, wherein the plurality of web stickies comprises:

a personal web sticky being accessible by only the creator of the web sticky;

a private web sticky being accessible by only an authorized group of users; and a public web sticky being accessible by any user accessing the web page.

15. The system of claim 12, further comprising means for presenting the information entered by the user to only other users authorized to view the information in response to a computer pointing device being positioned in contact with the web sticky icon.

16. The system of claim 10 further comprising means for presenting a word label to any users accessing the web page to identify a type of web sticky in response to a computer pointing device contacting the web sticky icon on the web page.

* * * * *